United States Patent
Kandlikar et al.

(10) Patent No.: US 10,890,377 B2
(45) Date of Patent: Jan. 12, 2021

(54) VOLCANO-SHAPED ENHANCEMENT FEATURES FOR ENHANCED POOL BOILING

(71) Applicants: Satish Kandlikar, Rochester, NY (US); Austin Hayes, Aurora, OH (US)

(72) Inventors: Satish Kandlikar, Rochester, NY (US); Austin Hayes, Aurora, OH (US)

(73) Assignee: Rochester Institute of Technology, Rochester, NY (US)

( * ) Notice: Subject to any disclaimer, the term of this patent is extended or adjusted under 35 U.S.C. 154(b) by 37 days.

(21) Appl. No.: 16/392,861

(22) Filed: Apr. 24, 2019

(65) Prior Publication Data

US 2019/0339008 A1   Nov. 7, 2019

Related U.S. Application Data

(60) Provisional application No. 62/665,200, filed on May 1, 2018.

(51) Int. Cl.
*F26B 3/20* (2006.01)
*F26B 25/16* (2006.01)

(52) U.S. Cl.
CPC .............. *F26B 3/20* (2013.01); *F26B 25/16* (2013.01)

(58) Field of Classification Search
CPC .... F26B 3/00; F26B 3/20; F26B 25/00; F26B 25/16; F28F 3/12; F28F 13/08; F28F 13/187; H01L 23/473; F28D 2021/0028
USPC ......................................................... 34/427
See application file for complete search history.

(56) References Cited

U.S. PATENT DOCUMENTS

| | | | | |
|---|---|---|---|---|
| 5,259,448 A | * | 11/1993 | Masukawa | B21C 37/202 165/133 |
| 5,553,395 A | * | 9/1996 | Wen | C23C 16/4481 118/726 |
| 5,709,037 A | * | 1/1998 | Tanaka | F26B 5/04 34/330 |
| 5,937,937 A | | 8/1999 | Sehmbey et al. | |
| 5,940,985 A | * | 8/1999 | Kamikawa | H01L 21/67034 34/471 |
| 5,950,328 A | * | 9/1999 | Ichiko | H01L 21/67034 34/364 |
| 6,108,932 A | * | 8/2000 | Chai | H01L 21/67034 34/245 |
| 6,691,430 B2 | * | 2/2004 | Saito | H01L 21/67034 134/902 |
| 6,729,041 B2 | * | 5/2004 | Shindo | H01L 21/6708 34/218 |

(Continued)

FOREIGN PATENT DOCUMENTS

CN  105716467  11/2017

OTHER PUBLICATIONS

Pool boiling heat transfer and bubble dynamics over plain and enhanced microchannels. Journal of Heat Transfer, 2011. Pages.

(Continued)

*Primary Examiner* — Stephen M Gravini
(74) *Attorney, Agent, or Firm* — Bond, Schoeneck & King, PLLC; Joseph Noto (57) ABSTRACT

A system and method for enhanced pool boiling includes a substrate having a heat source, at least one volcano-shaped structure adjacent the surface of the substrate and liquid covering the at least one volcano-shaped structure and substrate.

6 Claims, 11 Drawing Sheets

(56) References Cited

U.S. PATENT DOCUMENTS

| | | | |
|---|---|---|---|
| 6,935,419 B2* | 8/2005 | Malone | F28F 3/02 165/146 |
| 7,228,645 B2* | 6/2007 | Pham | H01L 21/67034 118/608 |
| 7,581,335 B2* | 9/2009 | Tanaka | H01L 21/67028 118/900 |
| 8,205,352 B2* | 6/2012 | Lewis | H01L 21/68707 34/77 |
| 8,701,308 B2* | 4/2014 | Hiroshiro | H05B 3/0052 34/417 |
| 8,793,898 B2* | 8/2014 | Jeong | H01L 21/67034 34/351 |
| 9,103,607 B2 | 8/2015 | Furberg et al. | |
| 9,207,025 B2 | 12/2015 | Varanasi et al. | |
| 9,974,208 B2 | 5/2018 | Joshi et al. | |
| 10,018,430 B2* | 7/2018 | Kandlikar | H01L 23/473 |
| 10,100,411 B2 | 10/2018 | Frankiewicz et al. | |
| 10,217,692 B2 | 2/2019 | Haj-Hariri et al. | |
| 10,231,359 B2 | 3/2019 | Chainer et al. | |
| 10,473,410 B2* | 11/2019 | Jaikumar | F28F 3/12 |
| 2019/0339008 A1* | 11/2019 | Kandlikar | B23K 1/0012 |

OTHER PUBLICATIONS

Behavior of pool boiling heat transfer and critical heat flux on high aspect ratio microchannels. International Journal of Thermal Sciences, 2018. Pages.

Ultra-high pool boiling performance and effect of channel width with selectively coated open microchannels. International Journal of Heat and Mass Transfer, 2016. Pages.

Enhanced macroconvection mechanism with separate liquor vapor pathways to improve pool boiling performance. Journal of Heat Transfer, 2017. Pages.

Fabrication of 10um-scal conductive cu patterns by selective laser sintering of cu complex ink. Optics and Laser Technology, 2017. Pages.

* cited by examiner

VOLCANO-SHAPED ENHANCEMENT FEATURES FOR ENHANCED POOL BOILING

CROSS REFERENCE

This application claims the benefit of the filing date of U.S. Provisional Patent Application Ser. No. 62/665,200, filed May 1, 2018, which is hereby incorporated by reference in its entirety.

FIELD

The invention enhances heat transfer performance of a pool boiling system in which a liquid is boiled over a heated substrate with volcano-shaped features and heat transfer performance is characterized by improvement in at least one of the heat transfer coefficient (HTC) and the critical heat flux (CHF).

BACKGROUND

Pool boiling heat transfer provides an efficient mechanism for removing heat from a substrate. It results in generating vapor from a pool of liquid resulting from the heat transfer. Further improvements in its performance are characterized by: i) increasing the maximum heat dissipation capacity as governed by the critical heat flux (CHF) condition, and ii) increasing the heat transfer coefficient (HTC) at a given heat flux. Both the CHF and HTC during pool boiling are desired to be enhanced. The enhancement techniques available in literature incorporate modifications to the heater surface, such as fins, coatings, grooves, indentations and similar variations applied directly on the heater surface forming an integral part of the heater surface. Alternatively, particles such as nanoparticles or additives to the boiling liquid are added. Additives alter the composition of the liquid while non-reacting particles exhibit enhancement through changes in fluid properties or through deposition of the particles on the heater surface. The enhancements reported in literature are based on improved wickability, increased wettability, increased surface area, manipulating bubbles and bubble trajectories at the heater surface and other techniques applied directly on the heater surface.

SUMMARY

In accordance with one aspect of the present invention, there is provided a system for enhanced pool boiling, including:
a substrate having a heat source;
at least one volcano-shaped structure adjacent the surface of the substrate; and
liquid covering the at least one volcano-shaped structure and the substrate, wherein the dimensions of the at least one volcano-shaped structure at a base adjacent the substrate are larger than the dimensions at a top away from the substrate creating a contained volume between the at least one volcano-shaped structure and the substrate, wherein the at least one volcano-shaped structure comprises an opening at the base and an opening at the top (e.g., wherein the at least one volcano-shaped structure is attached to a surface of the substrate and has an opening including at least one hole in the base and an opening including at least one hole at the top or the at least one volcano-shaped structure is not attached to a surface of the substrate and has an opening including at least one gap between the base and the surface of the substrate and an opening including at least one hole at the top), such that upon heating vapor and entrained liquid is exhausted through one of the openings flowing from inside the contained volume to outside the contained volume and liquid is flowing through another opening from outside the contained volume into the contained volume, with the openings configured to generate a flow of vapor bubbles departing from the heated surface out of the contained volume in a predominantly continuous manner, and to generate a flow of the liquid into the contained volume in a predominantly continuous manner, with the exhausting vapor from within the contained volume not interfering with the incoming liquid to causing vapor blanketing or agglomeration at the heated surface, and the resulting configuration enhancing at least one of the heat transfer coefficient and the critical heat flux on the substrate.

In accordance with another aspect of the present disclosure, there is provided a method for enhancing pool boiling, including:
heating a substrate having at least one volcano-shaped structure adjacent the surface of the substrate and liquid covering the at least one volcano-shaped structure and the substrate; wherein the dimensions of the at least one volcano-shaped structure at a base adjacent the substrate are larger than the dimensions at a top away from the substrate creating a contained volume between the at least one volcano-shaped structure and the substrate, wherein the at least one volcano-shaped structure comprises an opening at the base and an opening at the top (e.g., wherein the at least one volcano-shaped structure is attached to a surface of the substrate and has an opening including at least one hole in the base and an opening including at least one hole at the top or the at least one volcano-shaped structure is not attached to a surface of the substrate and has an opening including at least one gap between the base and the surface of the substrate and an opening including at least one hole at the top), such that vapor and entrained liquid flows in a predominantly continuous manner through one of the openings from inside the contained volume to outside the contained volume and liquid flows in a predominantly continuous manner through another opening from outside the contained volume into the contained volume, with the exhausting vapor from within the contained volume not interfering with the incoming liquid to cause vapor blanketing or agglomeration at the heated surface, and enhancing at least one of the heat transfer coefficient and the critical heat flux on the substrate.

These and other aspects of the present disclosure will become apparent upon a review of the following detailed description and the claims appended thereto.

BRIEF DESCRIPTION OF THE DRAWINGS

FIG. 2 shows a volcano-shaped structure placed above a substrate surface with a gap between;

DETAILED DESCRIPTION

The disclosure includes a system and method for enhanced pool boiling. The system includes a substrate having a heat source, at least one volcano-shaped structure adjacent the surface of the substrate and liquid covering the at least one volcano-shaped structure and substrate.

The system includes a substrate having a heat source, a liquid over the substrate and a volcano-shaped structure or a plurality of volcano-shaped structures attached to or separate from the surface of the substrate. A volcano-shaped structure is considered a structure having a base larger than the top portion, wherein a cross-sectional area at the base is greater than the cross-sectional at the top. The volcano-shaped structure has at least one top opening (the top opening can have any shape) and at least one bottom opening (the bottom opening can have any shape) at the base. The sides of the volcano-shaped structure, its top and the base on the substrate enclose a contained volume. The sides can have a shape other than straight. In an embodiment, the volcano-shaped structure is attached on the heater substrate and is attached by fixtures or any other mechanical means, such as fasteners, soldering, glueing, welding, etc. In an embodiment, the volcano-shaped structure can be placed above the heater substrate; it has openings near the base. The volcano-shaped structure can be placed above the heater substrate with a gap between which serve as an opening. The gaps or openings near the base provide a fluid communication and flow path between the contained volume and the external space filled with liquid. In an embodiment, multiple volcano-shaped structures are placed to cover a larger heated substrate area by placing the structures adjacent to each other in such a fashion that the gaps or openings from adjacent structure do not interfere with the fluid flow paths or streamlines. In an embodiment, the multiple volcano-shaped structures are connected to each other, and affixed to the substrate by any means such as mechanical fastening, bonding, soldering, etc. The substrate can be of any shape other than flat, including, but not limited to, curved, external tubular, and irregular surface. The substrate may additionally have other surface enhancement features including, but not limited to, porous coatings, fins, microgrooves, microchannels, nanostructures, graphene coatings, etc. The volcano-shaped structure may be placed vertically above a heated substrate in a gravitational field. In another embodiment, it may be placed underneath the heated substrate, the vapor exhausting from the gaps or openings from adjacent volcano-shaped structure are adjusted in size and position to avoid interference with the flow from other volcanos. A venting arrangement to remove vapor from underside of a horizontal heated substrate is preferred in this configuration.

According to this invention, heat transfer performance during pool boiling is enhanced by introducing the volcano-shaped structure, placed above the heater surface forming a contained volume between the heater surface and the structure and providing two sets of one or more openings—one set mainly for liquid and vapor flow out from the contained volume and the other set mainly for providing liquid entry to the contained volume directed towards the heater surface. The volcano-shaped structure directs the bubbles after their departure from the heater surface towards the first set of openings resulting in a two-phase flow of liquid and vapor discharging from the contained volume and liquid entering into the contained volume from the second set of openings towards the heater surface. The two-phase structure of the bubbles and entrained liquid departing from the contained volume, and liquid arriving in the contained volume follow consistent identifiable pathways. Thus, providing a screened volcano-shaped structure will provide inlet and outlet openings, these are random and are not controlled to provide the desired enhancement effect resulting from the defined pathways described in this invention.

Figure 1:
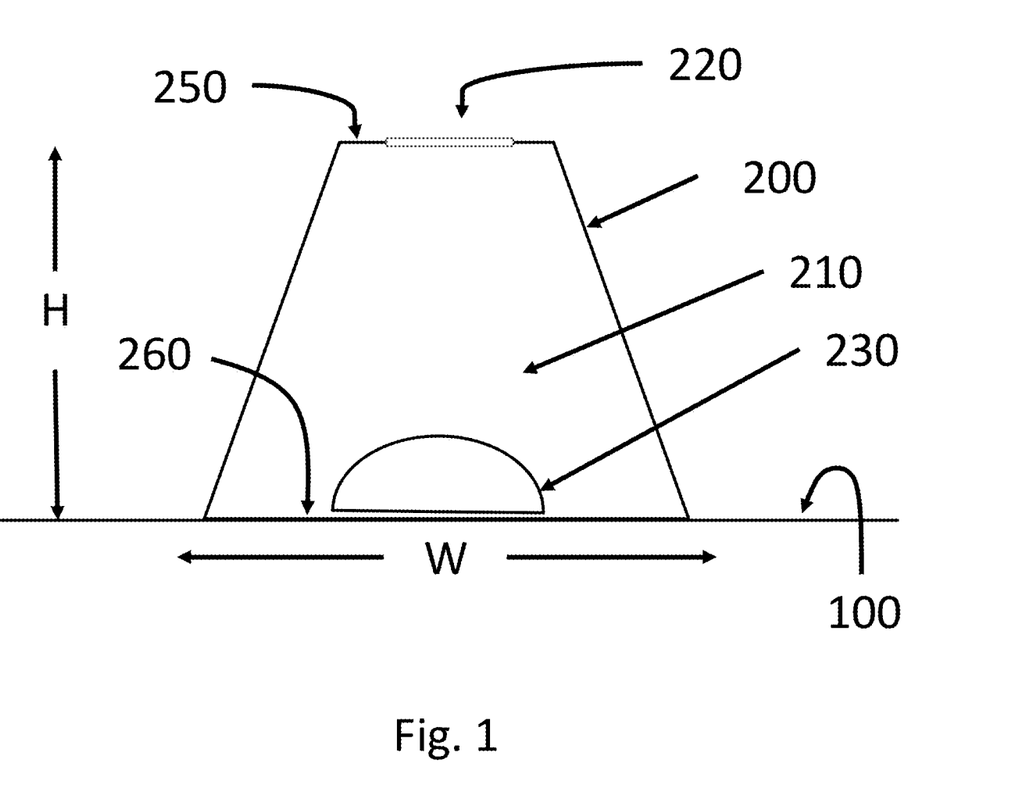
FIG. 1 shows a volcano-shaped structure attached to a substrate surface.
Figure 2:
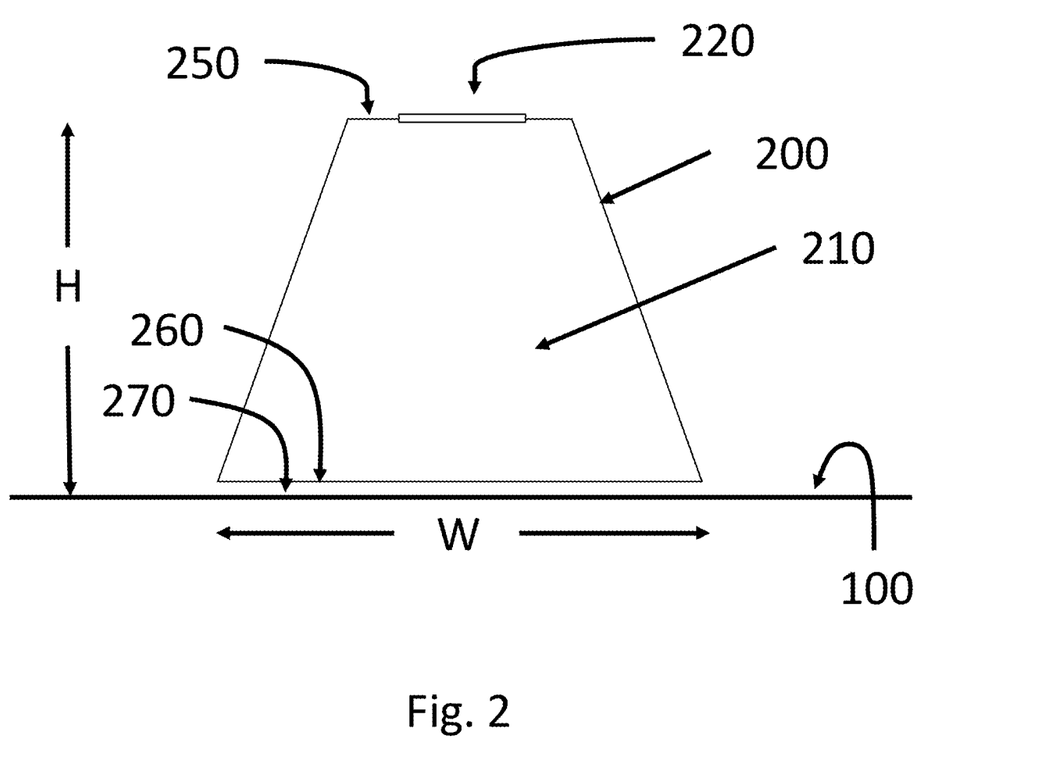

In an embodiment, the volcano-shaped structure is placed adjacent to another volcano-shaped structure in such a fashion as to avoid the exiting vapors from the contained volume of one structure being induced back into the contained volume of the neighboring structure. FIG. 1 shows the volcano-shaped structure attached to a heated substrate 100. The volcano-shaped structure has sides 210, a top 250 and a base 260 that contains a contained volume bounded by these surfaces. The top 250 has a hole 220 and the sides 210 have gaps 230 near the base. The gaps are as close to the base as possible, desirably with no other element separating it from the substrate which would cause an obstruction to the fluid flow near the substrate, although sometimes an element may become necessary from structural viewpoint, in which case its height is kept as small as possible. FIG. 2 shows a representative volcano-shaped structure that is placed above the heater surface with a gap 270. This gap allows fluid flow into and out of the contained volume. There may be structural elements, not shown in the figure, that hold the volcano-shaped structure to the base.

Figure 3:
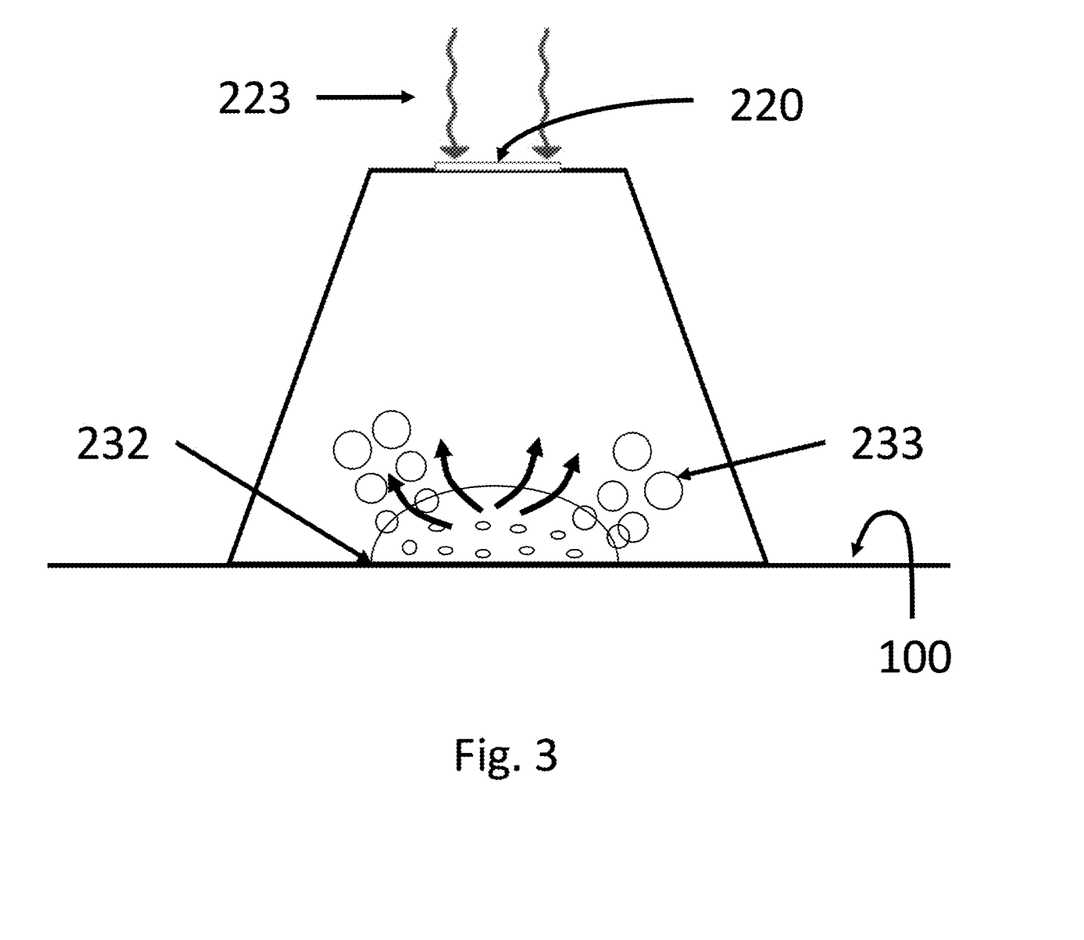
FIG. 3 shows an embodiment of operation of pool boiling with a liquid boiling over the substrate and adjacent volcano-shaped structure.

The operation of pool boiling with a liquid boiling over the substrate is shown in FIG. 3. The top hole 220 in FIG. 3 is small such that it introduces a restriction to the bubbles exiting from the contained volume and forces them to exit as bubbles and entrained liquid 233 from gaps or openings 232. In response, liquid flow 223 is established from the bulk liquid through the hole 220 into the contained volume and towards the heater. The flow of liquid and vapor establish individual streams, although occasionally the local oscillations and perturbations in the flow field may lead to flow oscillations, localized flow reversals and occasional entrainment of vapor bubbles into the liquid stream. When these perturbations and flow reversals become significant, they lead to deterioration in HTC and CHF. Thus, the improvement in HTC and CHF is an indicator that the flow paths described are effectively occurring.

Figure 4:
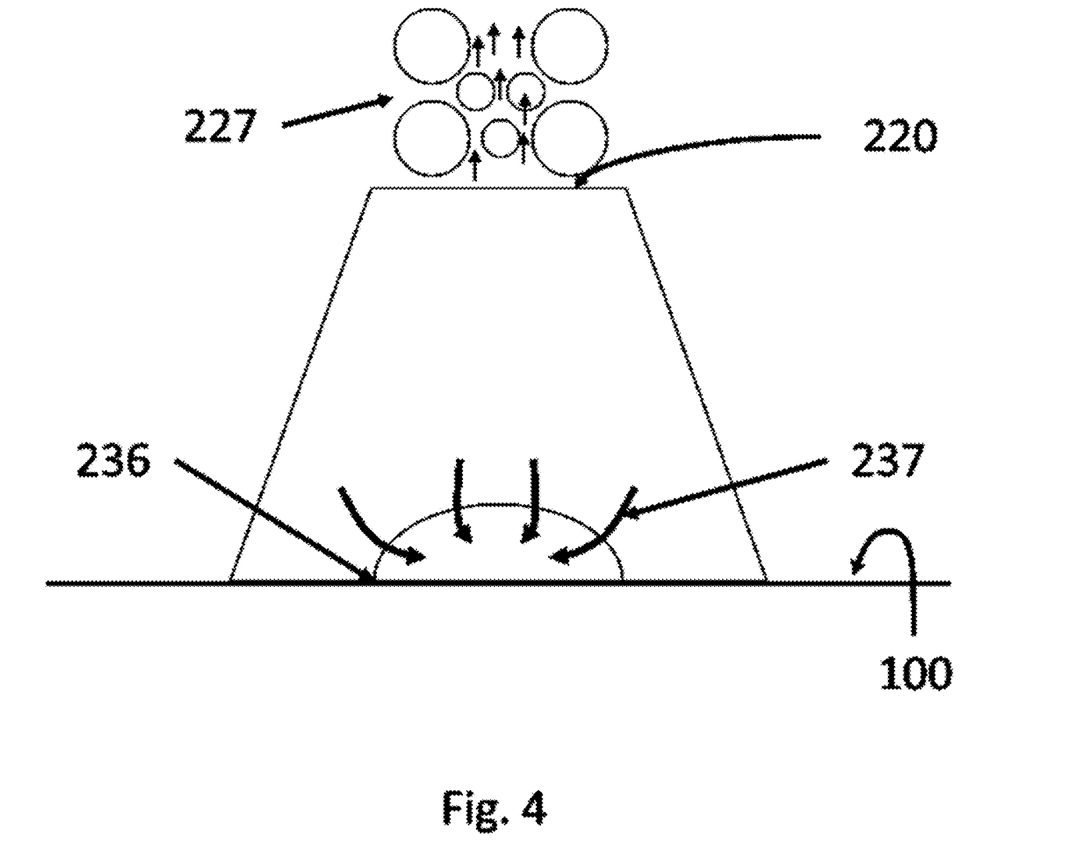
FIG. 4 shows an embodiment of operation of pool boiling with a liquid boiling over the substrate and adjacent volcano-shaped structure.

When the diameter of the top hole is large enough, larger than the departure bubble diameter as a basic reference in pool boiling, the flow configuration shown in FIG. 4 takes place. Here the top hole 226 allows the bubbles and the liquid 227 to exit the contained volume from the top while the liquid 237 flows into the contained volume through the gap 236.

The diameter of the top hole and size of the gaps or openings are important considerations. The flow resistance to a vapor stream with entrained liquid is much higher and prefers a larger opening. Thus, when the top hole diameter is small, the vapor cannot freely escape from this hole and seeks alternative pathway exiting through the gaps and openings. Conversely, when the hole diameter is large, the flow resistance is reduced and vapor and the entrained liquid 227 exit from the contained volume through this hole and liquid stream 237 enters the contained volume through the gaps and openings as shown in FIG. 4.

Figure 5:
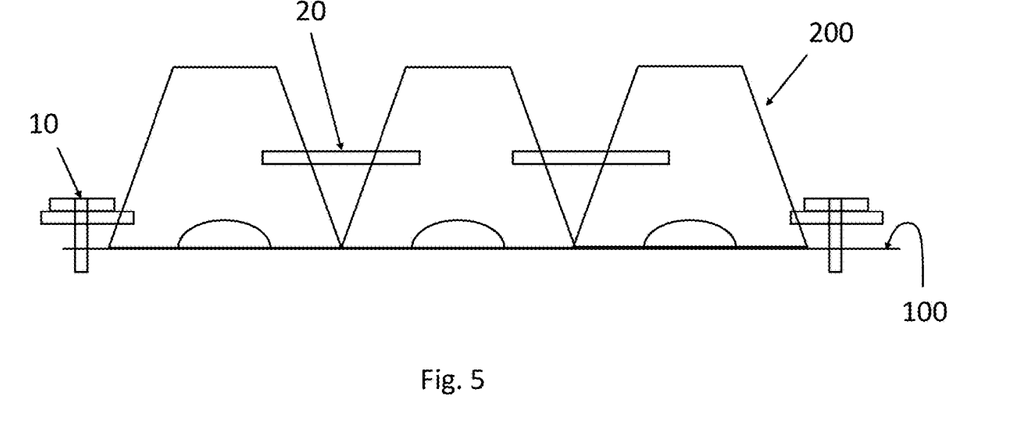
FIG. 5 shows an embodiment in which three volcano-shaped structures are attached together with connectors and the assembly is fastened to the heated substrate with fasteners.
Figure 6:
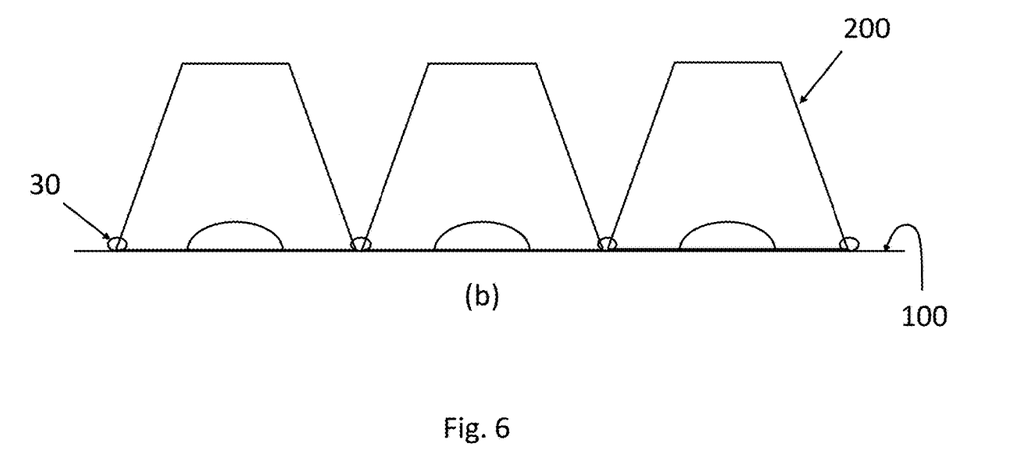
FIG. 6 shows a solder that connects the volcano-shaped structure to the substrate.

FIG. 5 shows another embodiment in which three volcano-shaped structures 200 are attached together with connector 20 and the assembly is fastened to the heated substrate 100 with fasteners 10. The volcano-shaped structures are shown in one dimension, although more volcano-shaped structures can be attached in the perpendicular direction. The placement and spacing of the cones are determined by avoiding the interaction between two adjacent vapor and exit liquid streams and easy access of liquid to the contained volume. The volcano-shaped structures shown in FIG. 5 are external pieces which are attached on the substrate. The volcano-shaped structures can be integral part of the substrate 100 by welding or any other chemical, mechanical or other suitable means as shown in FIG. 6 where 30 shows a solder that connects the volcano-shaped structure to the substrate.

The volcano-shaped structures can take other shapes, such as circular, rectangular, hexagonal. They can also take any other regular shape, such as triangular, hexagon, etc., or irregular to match the substrate geometry or achieve a desired placement pattern. Different shapes may be incorporated in the same system. The holes and gaps can also be of any shape, such as circular, rectangular, square, semicircular, elliptical, arc, etc., to achieve the desired flow structure and flow field inside and outside the contained volume. In an embodiment, the volcano-shaped structure can have a base which is rectangular and long in one direction. Several such volcano-shaped structures can be placed adjacent to each other on the long side. The top hole in this embodiment can take the shape of a slot, which may be continuous or discontinuous on the top. In this configuration, there are two streams formed, one from the top slot and the other from the gap near the base. The flow field is thus divided into two-dimensional streams as compared to discrete steams emerging from holes and gaps in the volcano-shaped structures where the base is nearly square or the sides of the base have an aspect ratio that is in the range of about 0.5 to about 2. In the long-version of the base, the aspect ratio can be beyond the limit dictated by 0.5 or 2. The limiting value depends on the maximum dimension of the heated substrate, however, shorter sides may be incorporated based on other considerations such as fabrication or local instability considerations. The cross-section of the long volcano-shaped structure along the long side will be similar to that of the volcano-shaped structures described in the figures, for example, FIGS. 1 and 2.

Figure 7:
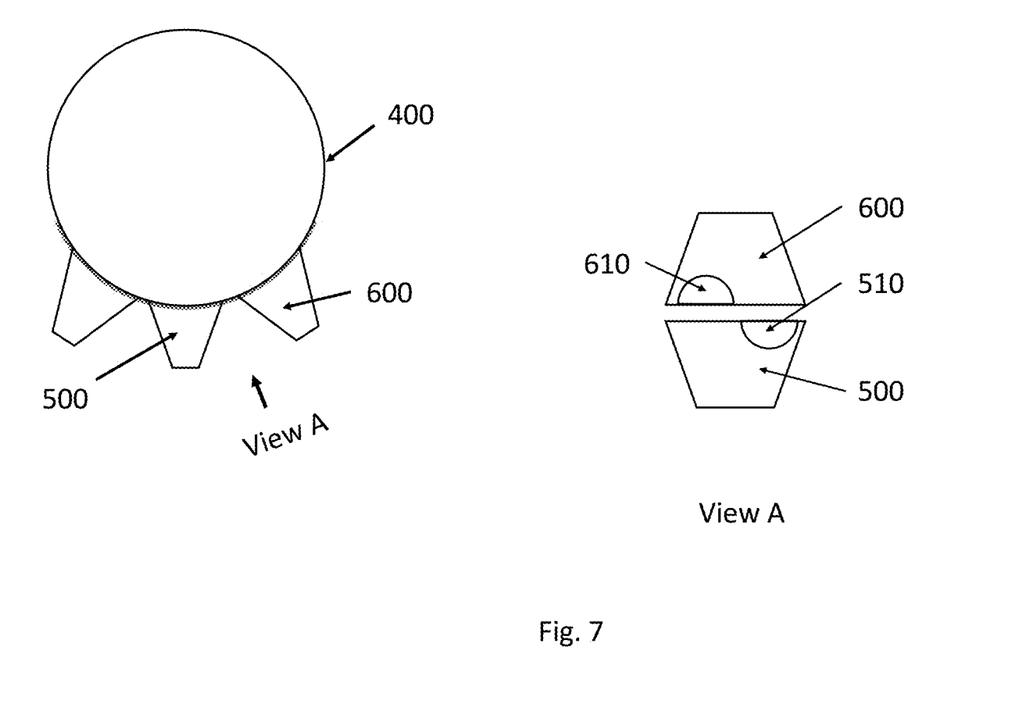
FIG. 7 with inset shows external boiling over a tubular or a curved surface.

The arrangements shown in FIGS. 3 and 4 represent the operation of the unit in vertical orientation with bubbles rising away due to buoyancy. The operational flow streams can be reversed by adjusting the hole and gap dimensions such that the liquid flow into the contained volume and vapor exit from the contained volume can be accomplished under adverse gravitational direction. It is thus possible to use this structure under a vertically downward facing substrate such that the gaps are wide enough to allow the vapor to escape freely while liquid enters from the hole. The top face in this configuration actually is placed underneath and away from the substrate. Thus a sustained liquid flow toward the heated substrate is established in conjunction with the vapor exiting the gaps close to the heated substrate. This concept is extended to the external boiling over a tubular or a curved surface as shown in FIG. 7. The curved substrate 400 is shown with two volcano-shaped structures, although more cones in different dimensions, circumferential and axial can be incorporated. The cone 500 exits vapor through the gaps 510 near the substrate, while an offset gap in cone 600 allows liquid to enter and vapor to escape from the other side, which is at a higher circumferential orientation, of cone 600. Alternatively, cone 600 can also be designed to have liquid inflow from the hole and vapor escaping from the gaps or openings.

The bubbles are generated from the boiling process and leave the heater surface due to buoyancy induced flow. In buoyancy driven bubble removal process from a horizontal surface, the bubbles leaving the surface interfere with the liquid arriving from the bulk liquid towards the heater surface. This bubble crowding increases with heat flux and results in liquid starvation to the heater leading to critical heat flux.

The volcano-structure can be used in the absence of gravity or low gravity environment. However, an initial start-up may be needed to establish the flow streams. This can be done by injecting liquid through the desired hole or gap. Other techniques to accomplish this objective can be implemented by using auxiliary heaters, valves, etc.

The volcano-shaped structure has a higher base area and a smaller cross-sectional area near the apex. The apex has a hole which allows for bubble removal under buoyancy forces.

Since the bubbles are collected in the contained volume and are exhausted from the apex, they come out in a stream that forces the vapor and entrained liquid to go away from the heater surface. The spacing of the apexes of the adjacent domes are such that the two vapor streams do not interfere with each other and facilitate liquid flow back to the heater. This spacing is at least of the departure diameter size. Larger holes will provide better outflow. However, very large holes will not provide the increase in the velocity of the exiting stream due to flow area reduction and may prevent establishing the flow field. The volcano-shaped structure is not to be confused with the domes used in steam generators where these domes are used to collect the steam and remove it from the steam generator. In an embodiment, the volcano-shaped structure in the present invention are small-scale structures, with their base coverage preferably not exceeding 5-30 mm in size and their height preferably not exceeding 5-30 mm. These limits may be exceeded depending on specific system requirements, such as low pressures result in larger bubble sizes, performance domain, or heater size constraints impose some restrictions. Other such considerations may be applicable resulting in higher heights than 30 mm. The aspect ratio defined as the ratio of height to width of the volcano-shaped structure is close to 1, generally within 0.5 to 2 in the preferred embodiments. In some embodiments, a pipe like structure may be placed additionally above the top hole to vent the vapor further away from the heater. The increased height provides more buoyant forces to drive the vapor away in vertical gravitational configurations, which is balanced with the pressure drop in the pipe. An excess pressure drop will lead to a reduction in the vapor-liquid mixture flow rate and cause vapor buildup inside the contained volume in the volcano-shaped structure above the heater surface and deteriorate at least one of the HTC and CHF. The advantage of a long pipe is that it reduces the ability of vapor to come back through recirculation to the heater surface since it is further removed. The aspect ratio of the base cross-section, that is the ratio of the two base sides, in these volcano-shaped structures is within 0.5 to 2. Other structural changes may be incorporated to address some of the operational or performance issues in a particular system.

In an embodiment of the long volcano-shaped structures with the aspect ratio of the base cross section lower than 0.5 or higher than 2, the liquid and liquid-vapor streams take a sheet like structure.

The volcano-shaped structure effectively reduces the space occupied by the vapor above the heater surface due to the tapered shape of the sides which provide cross-sectional area that is wider at the base placed on the heater surface and narrower at the top placed away from the heater surface. The removal of the collected bubbles from a predetermined hole and flowing liquid at the heater surface into the contained volume sets up a unidirectional flow that is self-supporting and self-feeding. This means that as the process intensifies, the flow field becomes stronger and bubbles are removed more efficiently from the heater surface and liquid is introduced more efficiently at the heat surface. The term efficiently here means that the flow resistance to these streams is reduced due to interference caused by other phase and other flow streams. The chaotic nature of the boiling process will make it difficult to completely avoid such interference streams, but the merit of an enhancement system is determined by the low level of such interference that still provides considerable enhancement. The well-defined flow field allowing relatively easy access of liquid to the heater surface, as compared to a surface without volcano-shaped structures, improves HTC. The well-defined flow field also reduces the crowding of bubbles at the heater surface and improves CHF. The enhancement mechanism relies on providing efficient vapor removal and efficient liquid supply at the heater surface by reducing the interactions between the two streams. Further, the liquid entry may be directly on to the heater surface such that heat transfer enhancement due to increased liquid velocity over the heater surface.

In an embodiment, a system for enhanced pool boiling includes a substrate with a heat source and a volcano-shaped structure, with a base dimension at the heater substrate larger than the dimension away from the substrate, placed adjacent to another volcano-shaped structure, creating a contained volume between the structure and the substrate, with the structure having holes on its surface or creating holes through a gap between the structure and the substrate, for exhausting vapor and entrained liquid through one set of holes and flowing liquid from outside the contained volume into the contained volume, with the holes sizes and positions determined to generate a flow of bubbles departed from the heater surface out of the contained volume through the first set of openings in a predominantly continuous manner, and flowing the liquid into the contained volume in a predominantly continuous manner, with the exhausting vapor from the structure not interfering with the incoming liquid to cause vapor blanketing or agglomeration at the heater surface, and the resulting configuration enhancing at least one of the heat transfer coefficient and the critical heat flux on the substrate.

In an embodiment, a vertical volcano-shaped structure with vapor exhausting from top one has volcano-shaped structures placed adjacent to another volcano-shaped structure, with each volcano-shaped structure forming a single top hole for vapor exhaust and one continuous gap or several distinct gaps between the volcano-shaped structure and the substrate, and placed on a flat horizontal surface, horizontal surface being within +−30 degrees to a horizontal plane, and the top hole at a higher vertical elevation from the substrate covered by the volcano-shaped structure, and the equivalent diameter of the top hole in the range 1-10 mm, and the side gap from 10 micrometer at its lowest to 8 mm at its widest, with a preferred range of 100 micrometer to 5 mm, and the vertical height of the volcano-shaped structure above the heater surface from 3 mm to 50 mm, with a preferred range of 3 mm to 115 mm, such that when a heat flux is applied to generate bubbles beyond the isolated bubble region of pool boiling the departing bubbles from the substrate converge toward the top opening and flow out in a continuous stream and the net flow of liquid enters from the gap or gaps resulting in enhancement in at least one of the heat transfer coefficient or critical heat flux.

In an embodiment, a vertical volcano-shaped structure with vapor exhausting from sides one has volcano-shaped structure placed adjacent to another volcano-shaped structure, with each volcano-shaped structure forming a single top hole for vapor exhaust and one continuous gap or several distinct gaps between the volcano-shaped structure and the substrate, and placed on a flat horizontal surface, horizontal surface being within +−30 degrees to a horizontal plane, and the top hole at a higher vertical elevation from the substrate covered by the volcano-shaped structure, and the equivalent diameter of the top hole in the range 0.5-10 mm, and the side gap or gaps from 10 micrometer at its lowest to 8 mm at its widest, with a preferred range of 100 micrometer to 5 mm, and the vertical height of the volcano-shaped structure above the heater surface from 3 mm to 50 mm, with a preferred range of 3 mm to 115 mm, such that when a heat flux is applied to generate bubbles beyond the isolated bubble region of pool boiling the departing bubbles from the substrate flow out from the contained volume through the gap between the substrate and the volcano-shaped structure and the net flow of liquid from outside the volcano-shaped structure enters the top hole in resulting in enhancement in at least one of the heat transfer coefficient or critical heat flux.

The concepts presented here can be extended to other configurations wherein the strength of the flow field can be utilized in improving the boiling performance on curved geometries. As an example embodiment, the bottom surface of a tube with boiling occurring on its outside surface is presented.

The disclosure will be further illustrated with reference to the following specific examples. It is understood that these examples are given by way of illustration and are not meant to limit the disclosure or the claims to follow.

Example 1

Figure 8A:
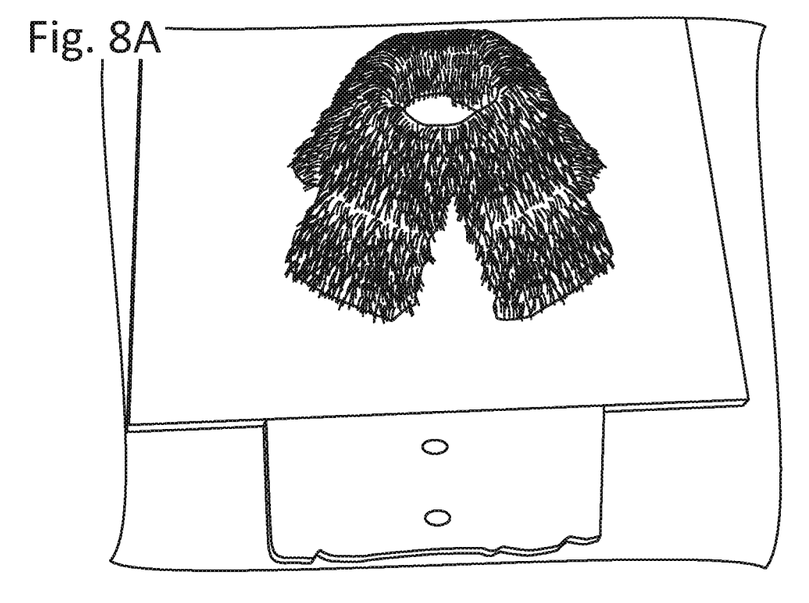
FIG. 8A shows Chip 2 with a single volcano-shaped structure and FIG. 8B shows Chip 4 with four miniaturized volcano-shaped structures.
Figure 8B:
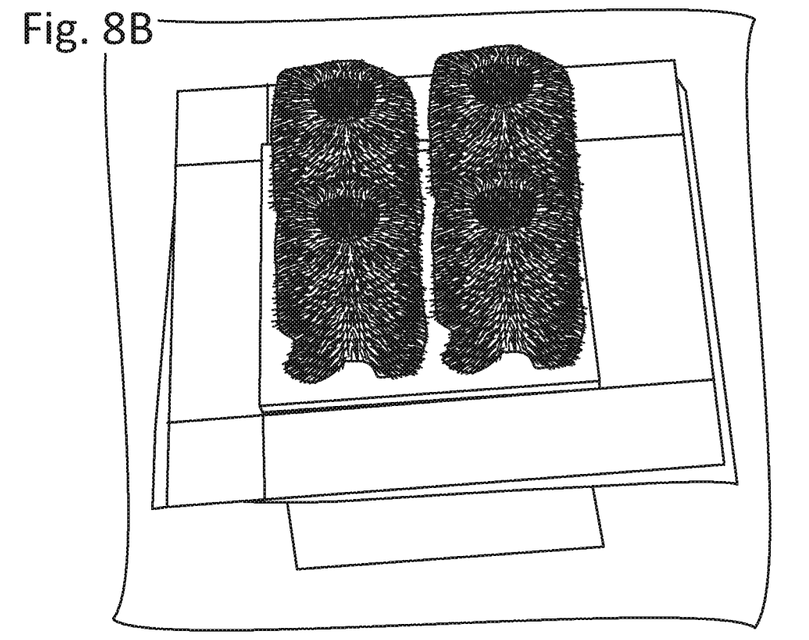

The boiling performance of five different volcano-shaped structure configurations is presented. The description and dimensions of the chips outlined in FIG. 8 are given in Table 1. Chip 1 and Chip 2 are nearly identical with the exception of the top hole diameter which is varied to demonstrate its effect on the boiling performance and enhancement mechanism. Chip 3 is geometrically similar to Chip 2 and is fabricated by bonding the volcano-shaped structure to the heater surface using a thermally insulating epoxy instead of printing directly on the surface. Doing so largely negate the fin effects as heat transfer to the volcano-shaped structure from the substrate is impeded. The volcano-shaped structure for Chips 1, 2, and 3 are located at the center of the boiling area. Chip 4 and Chip 5 use a miniaturized version of the volcano-shaped structure that reduces the entrance length of the rewetting liquid and thereby increases the HTC and CHF. The boiling area was divided into four quadrants with each quadrant containing one miniaturized volcano-shaped structure. These were printed on a plain surface (Chip 4) and over a microchannel surface (Chip 5). The microchannels were 300 μm wide and 300 μm in depth and the fin width was also 300 μm. FIG. 8A shows Chip 2 with a single volcano-shaped structure and FIG. 8B shows Chip 4 with four miniaturized volcano-shaped structures as examples of these surfaces.

TABLE 1

Hollow Conical Structure (volcano-shaped structure) design dimensions.

| Chip # | Description | Base diameter (mm) | Top hole diameter (mm) | volcano-shaped structure height (mm) | Side hole height (mm) | Side hole width (mm) |
|---|---|---|---|---|---|---|
| 1 | Small top hole | 9.63 | 1.05 | 5.55 | 3.07 | 2.10 |
| 2 | Large top hole | 9.70 | 3.00 | 5.16 | 2.63 | 2.08 |
| 3 | Thermally insulated volcano-shaped structure | 9.87 | 3.06 | 5.49 | 2.59 | 2.77 |
| 4 | Miniaturized volcano-shaped structure | 5.45 | 1.74 | 5.45 | 1.27 | 1.85 |
| 5 | Miniaturized volcano-shaped structure with microchannels | 5.40 | 1.84 | 6.32 | 1.71 | 1.55 |

Results and Discussion

Figure 9A:
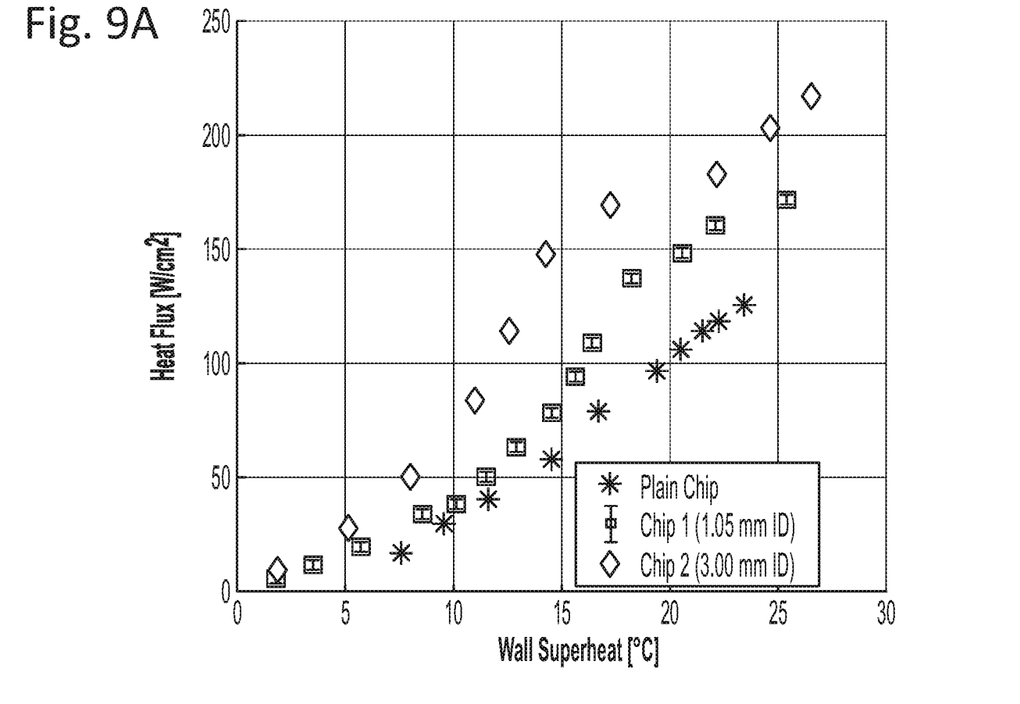
FIG. 9A shows a boiling curve.
Figure 9B:
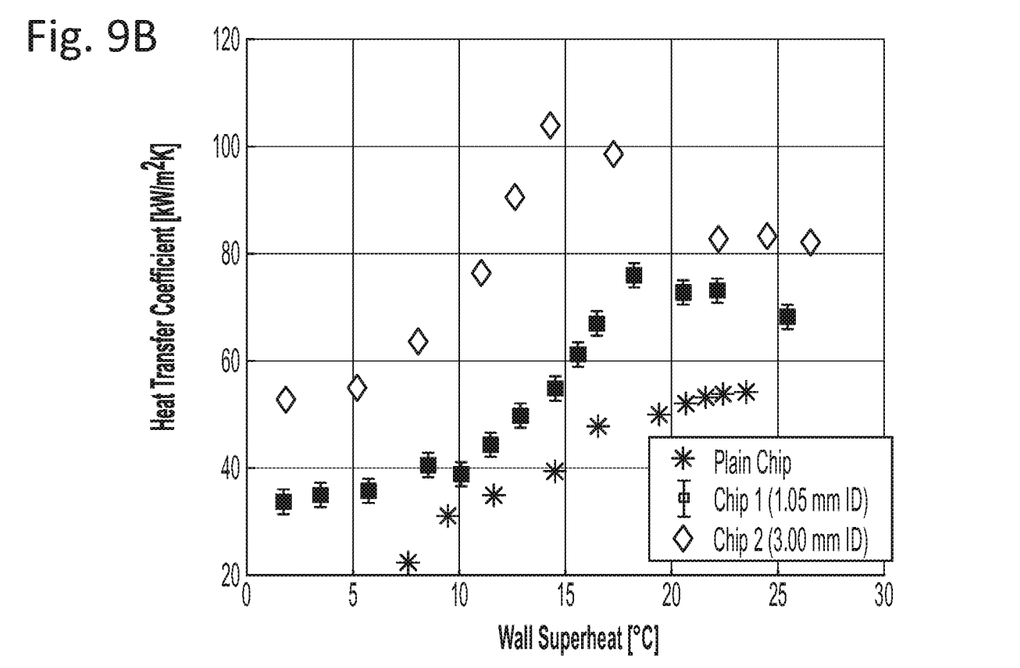
FIG. 9B shows a HTC plot comparison for Chips 1 and 2 with a plain aluminum chip.

Pool boiling tests were conducted on the chips listed in Table 1 and the results are discussed below. Their performance is compared with the boiling performance of a plain aluminum chip. The plain chip reached a CHF of 126 W/cm² and achieved an HTC of 54 kW/m²K. This is comparable to the previous results of the substrate effect on pool boiling CHF and matches very well with the presented model which predicts CHF at 130 W/cm². The effect of the top hole size on the boiling performance and the liquid and vapor flow pathways is studied by comparing the results with Chips 1 and 2. Chip 1 has a top hole diameter of 1.05 mm and Chip 2 has a top hole diameter of 3 mm. The departure bubble diameter was determined experimentally with high-speed imaging to be 2 mm for water. In both configurations, heat transfer is enhanced compared to a plain aluminum chip. FIG. 5 shows the variation of heat flux and heat transfer coefficient as a function of wall superheat for Chips 1 and 2 as well as a plain chip. The uncertainty associated with heat flux and heat transfer coefficient of Chip 1 is shown in FIGS. 9A and 9B respectively. Similar uncertainties were observed for all the other chips as well and are not shown to avoid crowding of the plots. Although Chips 1 and 2 were not tested up to CHF due to high temperatures reached in the heater block under the aluminum test chip, the boiling curves shifted to the left and maximum heat fluxes of 177 W/cm² and 217 W/cm² were obtained for Chips 1 and 2, respectively. HTC is enhanced by 37% and 81% for Chips 1 and 2 respectively, which indicates pathway 1 (vapor removal from the top hole and liquid supply from the side holes) to be the more efficient enhancement mechanism. In FIG. 8B, a peak can be seen in the HTC with increasing wall superheat. This behavior is indicative of the vapor removal capabilities of the surface. As heat flux increases, the rate of bubble generation also increases. As long as the surfaces ability to remove bubbles exceeds the bubble generation rate, HTC will increase with heat flux. However, when the bubble generation rate meets or exceeds the bubble removal rate, the HTC begins to decrease with increasing wall superheat.

FIG. 9A shows a boiling curve, and FIG. 9B shows a HTC plot comparison for Chips 1 and 2 with a plain aluminum chip.

Figure 10:
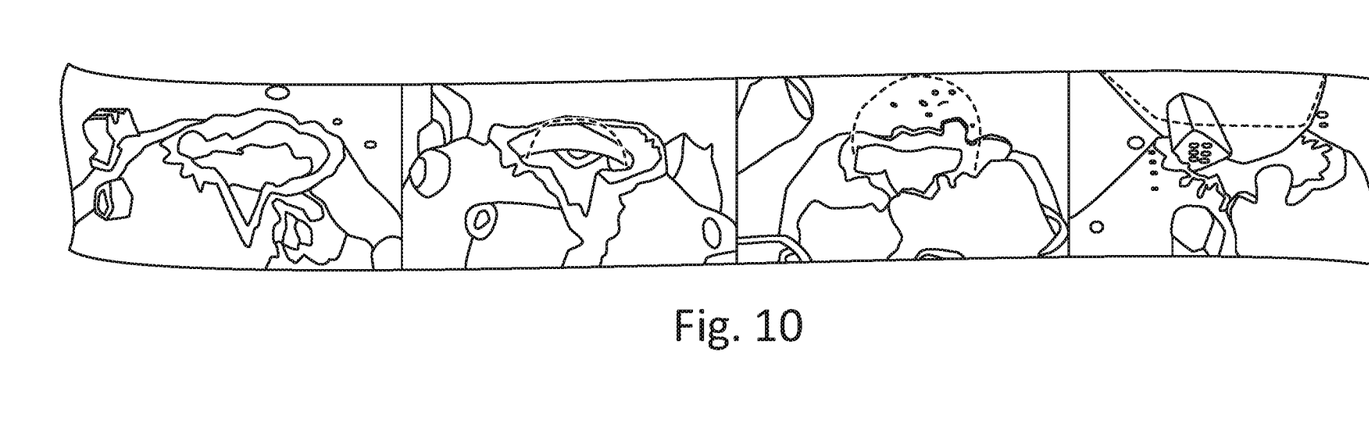
FIG. 10 shows high speed images of the vapor removal process at the top of the volcano-shaped structure for Chip 2.

To confirm the effects of the volcano-shaped structure on the liquid and vapor flow fields, high speed videos were taken at 4,000 fps. It was observed that Chip 1 had vapor bubbles venting from one of the side holes while the rest of the side holes and the top hole did not have any bubbles emerging from it. The small diameter of the top hole prevented the escape of the vapor bubbles and forced the bubbles to escape from one of the side holes (which were larger than the top hole). At lower heat fluxes the bubble departure process was not continuous and the liquid and vapor pathways were not clearly developed. As the heat flux increased, the vapor generation rate also increased and distinct liquid and vapor pathways were established. Visualization of bubble dynamics during boiling over Chip 2, however, showed the opposite mechanism to be active. Since the top hole diameter in Chip 2 was greater than the bubble departure diameter, vapor was expelled from the top hole. High speed images of the vapor removal process at the top of the volcano-shaped structure for Chip 2 at 9.5 W/cm² can be seen in FIG. 10. The dashed lines indicate the top of the bubble interface. Visualization of the sides of the volcano-shaped structure was also conducted and no vapor venting was observed for Chip 2. The enhancement in CHF and HTC for the two chips is believed to be primarily due to the structured unidirectional liquid-vapor paths created by the volcano-shaped structure. The bubble dynamics observed in Chip 2 exemplifies pathway 1 as vapor continuously exits from the top of the volcano-shaped structure. As the vapor phase acts with the buoyancy force of the bubbles, HTC is enhanced over pathway 2. However, at higher heat fluxes, the heat transfer coefficient with Chip 2 is seen to decrease beyond a wall superheat of around 15° C. It is believed that the vapor escaping from the top hole encountered a flow resistance as the vapor generation rate increased at higher heat fluxes.

The improvement in the boiling performance with the volcano-shaped structure printed on a plain heater surface can be attributed to two factors: i) enhanced convection due to altered motion of liquid over the heater surface and ii) fin effect due to conduction to volcano-shaped structure and boiling over the volcano-shaped structure surface. In order to isolate the influence of fin conduction, a detachable modular volcano-shaped structure was fabricated and attached to the heater surface using a low conductivity epoxy. The objective of this experiment was to evaluate the influence of convective heat transfer compared to the conduction effects (fin effect) in enhancing the boiling performance. With the volcano-shaped structure epoxied to the heater surface, the enhancements due to conduction effects are largely negated due to the thermal resistance offered by the epoxy layer between the volcano-shaped structure and the heater surface, and the improvement in heat transfer is a result of the fluid flow modulation alone. The geometry of the epoxied volcano-shaped structure on Chip 3 was identical to that on Chip 2.

Figure 11A:
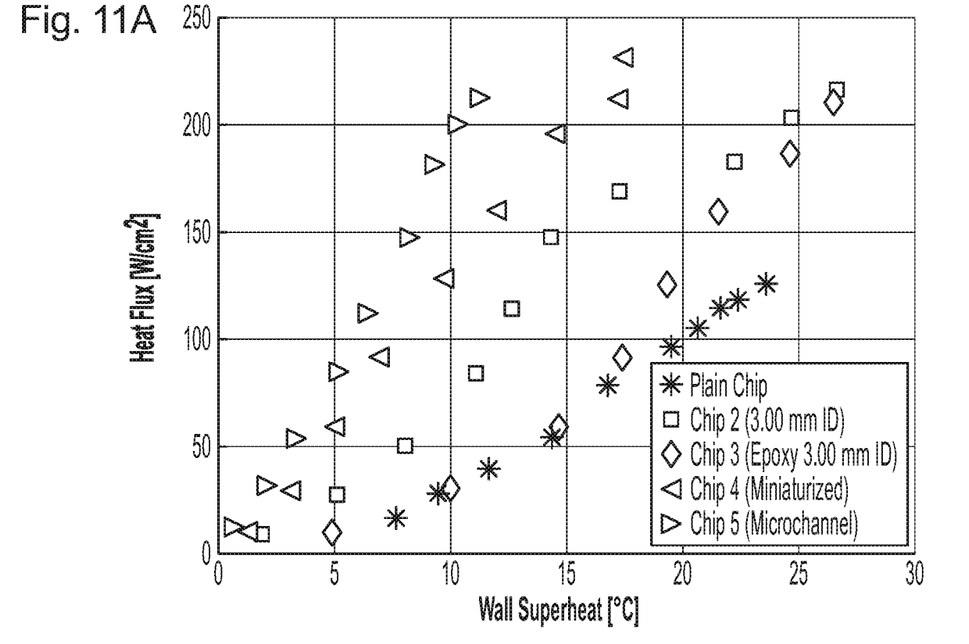
FIG. 11A shows a boiling curve.
Figure 11B:
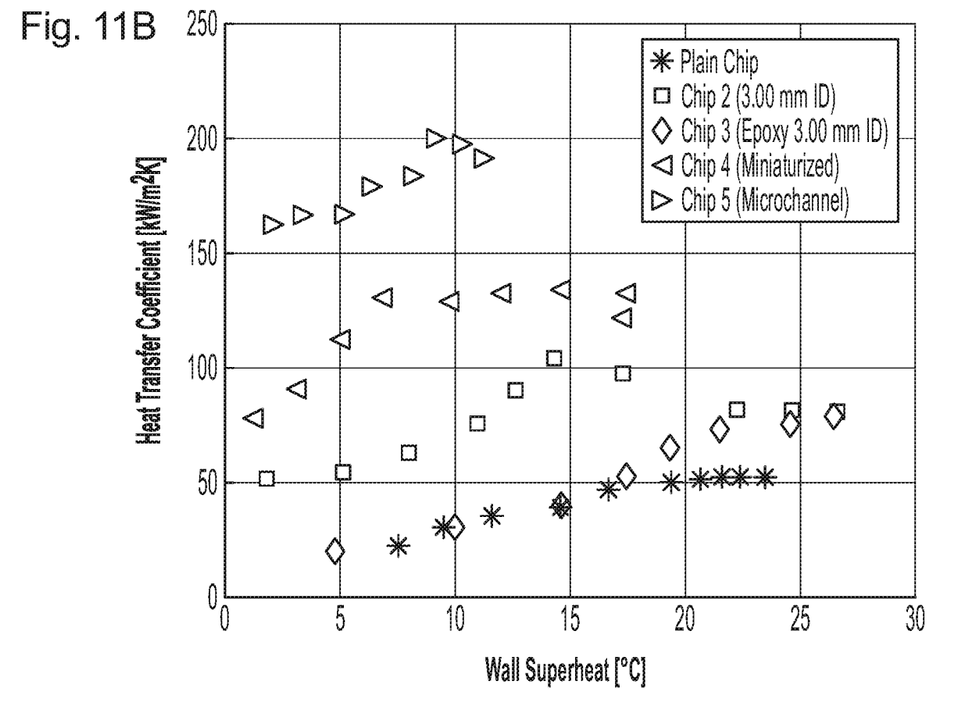
FIG. 11B shows a HTC plot comparison for HCS with epoxy, miniaturized, and microchannel enhancement.

The test chip with the thermally insulated volcano-shaped structure (Chip 3) reached a CHF of 211 W/cm² which represents a 67% improvement over plain aluminum as shown in FIG. 11. This enhancement is attributable to the enhanced convective heat transfer due to the creation of separate liquid and vapor pathways. This hypothesis is validated with high speed imaging depicting similar vapor venting through the top of the HTC chip and liquid suction through the side holes. The HTC of the thermally insulated chip (Chip 3) is also seen to increase by about 60% as compared to a plain chip. Since the HTC enhancement of Chip 2 (non-thermally insulated volcano-shaped structure) was 81%, this indicates that roughly 74% of the HTC improvement in Chip 2 resulted from flow field modulation. These results are significant since they demonstrate boiling enhancement by a simple surface attachment over the heater surface without the need to machine the heater surface itself.

Convective heat transfer in a channel is greatest in the developing flow region and when the flow is turbulent. In the current configuration, the developing flow region is the section of the surface between the side holes of the volcano-shaped structure where the liquid enters and the center of the volcano-shaped structure. By reducing the developing length, the convective heat transfer can be further enhanced. This is done with Chip 4 by fabricating four miniaturized volcano-shaped structure on a plain heater surface (see FIG. 8B). These miniaturized volcano-shaped structure were printed directly on the heater surface (similar to Chip 1 and 2) and had a top hole diameter of 1.85 mm which is comparable to the bubble departure diameter. This chip did not reach CHF but achieved a maximum recorded heat flux of 230 W/cm² at a HTC of 134 kW/m²K as shown in FIG. 11. This represents a 150% and 40% increase in HTC over a plain surface and a single volcano-shaped structure surface (Chip 2), respectively.

Finally, it is hypothesized that volcano-shaped structure can be printed over a heater surface with other enhancement types, such as microchannels on the surface, since the volcano-shaped structure is significantly larger than these traditional enhancement structures and further improvement in the boiling performance can be achieved. Chip 5 was fabricated with miniaturized volcano-shaped structure printed over a heater surface with 300 μm deep open microchannels. CHF was not reached, but a maximum heat flux of 213 W/cm² was achieved at a wall superheat of only 11° C. This represents a 2-fold increase in the maximum heat flux and an almost 4-fold increase in HTC over a plain surface as shown in FIGS. 11A and 7B. Thus, this demonstrates that flow field modulation with the volcano-shaped structure above the heater surface can be combined with other surface enhancements on the heater surface to further improve boiling performance.

A first order theoretical analysis is conducted to highlight the influence of heat transfer in the developing flow region on heat transfer coefficient between the single and multiple miniaturized volcano-shaped structure designs. The estimation of HTC was carried out for a heat flux of 75 W/cm². The ratio between the HTC of the miniaturized and single volcano-shaped structure design for single-phase liquid flow is used to compare the influence of developing length on the boiling performance. Neglecting the two-phase flow effects for a conservative estimate, the vapor volumetric flow rate leaving the volcano-shaped structure must be equal to the liquid flow rate entering the volcano-shaped structure. The velocity of the liquid entering the volcano-shaped structure through the side holes is computed based on the vapor generation rate. The Reynolds number (Re) is evaluated assuming the entrance length in the volcano-shaped structure as the characteristic length and a parallel plate, single-phase, forced convection model is utilized to find the average Nusselt number (Nu) and heat transfer coefficient:

$$\overline{Nu_L} = \frac{\overline{h}L}{k_f} = 0.664 Re^{\frac{1}{2}} Pr^{\frac{1}{3}} \text{ where } Pr \geq 0.6 \qquad (7)$$

where Nu is the Nusselt number, L is the characteristic length, Re is the Reynolds number, and Pr is Prandtl number. It is expected that when the developing length is halved, the HTC will increase significantly. However, individual geometric differences due to printing repeatability and inactive regions in the flow field are expected to introduce errors in this estimation. Nevertheless, a first-order comparison will provide useful guidance. Table 2 depicts the results from the parallel plate heat transfer analysis.

TABLE 2

Parallel plate HTC analysis for single and miniaturized volcano-shaped structure.

|  | Single volcano-shaped structure | Miniaturized volcano-shaped structure |
|---|---|---|
| $V_{liquid}$ (m/s) | 2.30 | 6.23 |
| Nu | 172.89 | 284.45 |
| HTC (kW/m²K) | 18.7 | 30.9 |

The theoretical ratio of HTC in miniaturized and single volcano-shaped structure is approximately 1.65. The experimentally obtained ratio for HTC is 1.5 (HTC for a single volcano-shaped structure (Chip 3) and miniaturized volcano-shaped structure (Chip 4) of 40 kW/m²K and 60 kW/m²K respectively). The predicted HTC values are lower than the experimental values mainly because the conduction effects were not accounted for in the theoretical analysis. However, variation in the experimentally determined HTC for Chip 3 and Chip 4 is similar to those predicted. Therefore, the heat transfer performance of a surface can be increased by reducing the developing length while ensuring separate liquid and vapor pathways.

Finally, the potential for real-world application of these structures is discussed. Although the heat flux was maintained under 230 W/cm² in experiments, this was done for safety reasons as the heater block would reach unsafe temperatures beyond this value. It is possible that these structures could dissipate even higher heat fluxes, but additional testing would be required to verify this. The appropriateness of the surface for a given application will depend on the required heat dissipation and maximum allowable wall temperature. The experimental results present here can be used as guidance to determine if they would provide sufficient cooling capabilities for the application. The fabrication time for these structures was relatively quick, just 3 minutes to print the single volcano-shaped structure and 6 minutes to print the four miniaturized volcano-shaped structure. In many heat transfer application, copper is typically used due to its preferable thermal properties. Aluminum was used over copper in the present work primarily due to manufacturing restrictions. Copper has a significantly higher melting temperature and would need to be heated to 1000° C. in order to achieve proper adhesion in printing, but this temperature is difficult to maintain. Additionally, copper oxidizes more readily than aluminum and thus, an inert printing atmosphere would be required. As AM technology continues to evolve, these concerns will likely be met. Although the secondary enhancement mechanism (increased nucleation sites) will not be active without proper metal adhesion, the primary enhancement mechanism (flow field modulation) will function regardless of the volcano-shaped structure material choice. This opens up the possibility of using thin-walled, high-temperature, low-cost polymers to accomplish the same boiling enhancement. These structures can thus be mounted and created as a secondary operation to allow immediate performance augmentation of any heat transfer surface.

The experimental procedure and features of Hayes et al. "Regulating flow of vapor to enhancing pool boiling" published in Applied Thermal Engineering 149 (2019) 1044-1051, is incorporated herein by reference in its entirety.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A system for enhanced pool boiling, comprising:
   a substrate having a surface;
   at least one volcano-shaped structure comprising a base, side and top enclosing a contained volume, the at least one volcano-shaped structure having at least one bottom opening and at least one top opening, wherein a cross-sectional area at the base is greater than a cross-sectional area at the top, the at least one volcano-shaped structure base adjacent to the surface of the substrate; and
   liquid covering the at least one volcano-shaped structure and the surface of the substrate, such that upon heating the substrate, vapor and entrained liquid exits the contained volume through either one of the at least one top opening and at least one bottom opening and liquid enters the contained volume through the other one of the at least one top opening and at least one bottom opening, with the openings configured to generate a flow of vapor bubbles departing from the surface of the heated substrate out of the contained volume in a predominantly continuous manner, and to generate a flow of the liquid into the contained volume in a predominantly continuous manner, with the vapor exiting from within the contained volume not interfering with the liquid entering the contained volume and enhancing at least one of a heat transfer coefficient and a critical heat flux on the substrate.

2. The system of claim 1, wherein the at least one volcano-shaped structure is attached to the surface of the substrate and the at least one bottom opening comprises at least one opening in the side at the base or the at least one volcano-shaped structure is not attached to the surface of the substrate and the at least one bottom opening comprises at least one gap between the base and the surface of the substrate.

3. A method for enhancing pool boiling, comprising:
   heating a substrate having at least one volcano-shaped structure comprising a base, side and top enclosing a contained volume, the at least one volcano-shaped structure having at least one bottom opening and at least one top opening, wherein a cross-sectional area at the base is greater than a cross-sectional area at the top, the at least one volcano-shaped structure base adjacent to a surface of the substrate;
   and covering the at least one volcano-shaped structure and the substrate with a liquid, such that vapor and entrained liquid flows in a predominantly continuous manner through either one of the at least one top opening and at least one bottom opening from inside the contained volume to outside the contained volume and liquid flows in a predominantly continuous manner through the other one of the at least one top opening and at least one bottom opening from outside the contained volume into the contained volume, with the vapor exiting from within the contained volume not interfering with the incoming liquid and enhancing at least one of a heat transfer coefficient and a critical heat flux on the substrate.

4. The method of claim 3, wherein the vapor and entrained liquid flows out the at least one top opening of the at least one volcano-shaped structure and the liquid flows in the at least one bottom opening of the at least one volcano-shaped structure.

5. The method of claim 3, wherein the liquid flows in the at least one top opening of the at least one volcano-shaped structure and the vapor and entrained liquid flows out the at least one bottom opening of the at least one volcano-shaped structure.

6. The method of claim 3, wherein the at least one volcano-shaped structure is attached to the surface of the substrate and the at least one bottom opening comprises at least one opening in the side at the base or the at least one volcano-shaped structure is not attached to the surface of the substrate and the at least one bottom opening comprises at least one gap between the base and the surface of the substrate.

* * * * *